INVENTOR.
ALBERT V. STOCKSLAGER ized Patent Office 3,507,313
Patented Apr. 21, 1970

3,507,313
LOCKNUT
Albert V. Stockslager, Montgomery, Pa., assignor to Standard Pressed Steel Co., Jenkintown, Pa., a corporation of Pennsylvania
Filed Oct. 8, 1968, Ser. No. 765,874
Int. Cl. F16b 39/12
U.S. Cl. 151—21                 7 Claims

ABSTRACT OF THE DISCLOSURE

A locknut of the type having a raised cylindrical collar integral with a standard hexagonal nut body is plastically deformed, both in the raised collar and in the nut body, thereby deforming the internal thread surface of the nut to create a self-locking feature.

---

This invention pertains to locknuts and more in particular to locknuts having a raised, substantially cylindrical collar integral with a standard hexagonal nut body.

Locknuts, when used in more sophisticated assembly operations, i.e., military hardware assemblies and automotive applications, must be seated to a specific bolt preload the first time the nut is installed and must be capable of removal and re-application through a repeated number of applications while maintaining the designed bolt pre-load.

Locknuts, when used through repeated cycles of use, are subject to internal thread wear and plastic deformation which tends to deteriorate the locking capability of the nut. Heretofore, locknuts prepared for use in such applications have been deformed radially inward at one or two selected locations on the nut collar and, in order to preclude plastic deformation and/or internal thread wear, the nuts have been heat treated to a hardness above $R_c$ 26. The additional step of heat treating locknuts, when the requirement for such lock nuts reaches high volume proportions, increases the manufacturing cost of the locknut. In addition, despite the fact that locknuts of the character described have heretofore been heat treated in order to preclude unwanted lessening of the self-locking action of the nut, these locknuts have shown somewhat limited reuse capabilities.

Since locknuts are heat treated to attain a hardness sufficient to retain acceptable locking capabilities through repeated cycles of use, there is the additional factor of excessive wear on the bolt or stud thread surface caused by the repeated frictional engagement with the hardened internal thread surface of the nut. Thread wear on the bolt or stud, especially where the stud member is fixed in a large assembly, can cause deterioration of the locking function and, consequently, where a predetermined stud load is critical, require extensive replacement costs to remove the worn stud.

Accordingly, it is an object of the present invention to provide a locknut which can be pre-loaded to a predetermined bolt load and which retains the desired bolt pre-load through repeated cycles of application. It is a further object of the present invention to provide a locknut of the character described which can be readily and economically manufactured to provide high torque-tension capabilities although employing non-heat-treated material. It is a still further object of the present invention to provide a locknut of the character described which prevents excessive wear on the co-acting bolt or stud.

In accordance with a preferred embodiment of the present invention, a locknut having a standard hexagonal body portion and an integral cylindrical collar, of substantially lesser thickness than the hexagonal body portion, is plastically deformed inwardly at a plurality of locations, both in the raised collar and in the nut body portion itself, thereby to deform the internal thread surface of the nut radially inwardly. A primary prevailing torque is provided as a result of the thread deformation in the collar area and a secondary prevailing torque is provided by the reformation in the hexagonal nut body portion. The secondary prevailing torque offers a backup support for the primary torque and tends to reinforce the primary torque when it would otherwise fall below minimum limits due to wear and/or plastic deformation caused by repeated frictional engagement with a threaded stud member.

Figure 1:
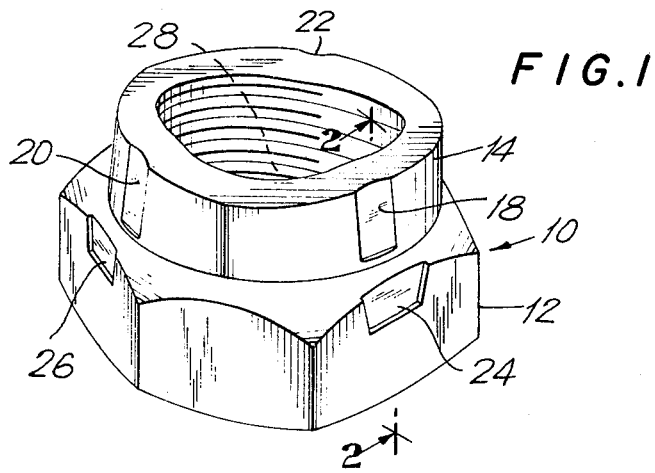
FIGURE 1 is a perspective view of the locknut constructed in accordance with the present invention.

With reference to the drawing, a nut 10 is shown having a hexagonal nut body portion 12 and an integral raised cylindrical collar portion 14 with a wall thickness $t$ significantly less than the wall thickness T of the hexagonal body portion. The nut is internally threaded, as at 16, to threadedly engage a threaded bolt or stud member (not shown). The raised collar 14 is deformed radially inwardly by a mechanical squeezing action to plastically deform the nut material, as at 18, 20 and 22, respectively, in order to deform the internal thread surface 16 at these uniformly spaced locations. It is to be understood that, depending on the predetermined prevailing torque to be applied to the bolt, the deformations can be located at a lesser or a greater number of places.

Figure 2:
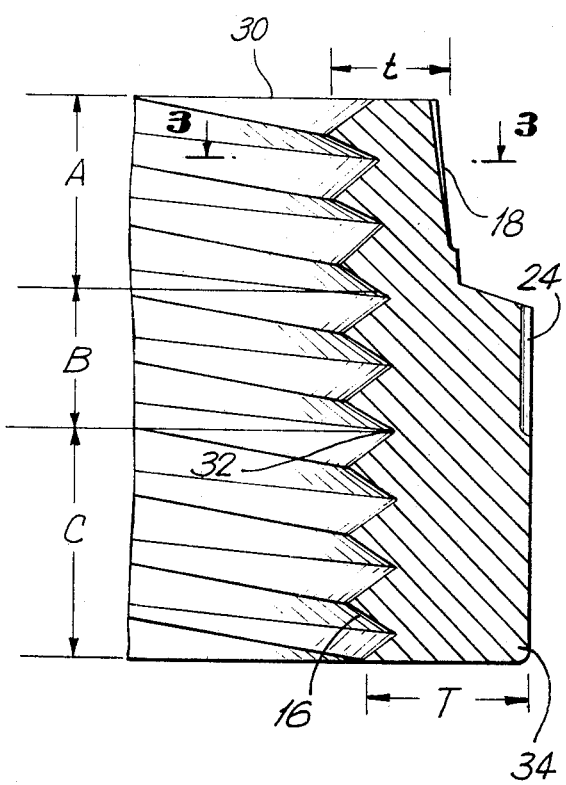
FIGURE 2 is an enlarged, vertical, sectional view taken in line 2—2 of FIGURE 1.

In addition to the deformation in the annular collar 14, a squeeze is applied in the hexagon nut body 12 at a similar number of locations 24, 26 and 28, respectively, to plastically deform the internal thread portions 16 immediately adjacent this area. The deformation in the nut body are located so as to be in general axial alignment with the collar deformations. The deformation in the areas 24, 26 and 28 is not as great as the deformation in the areas 18, 20 and 22 and, as seen in FIGURE 2, this results in an internal thread configuration wherein the area A within the collar portion 14 is displaced radially inwardly to a greater degree than the area B within the nut body portion 12. The deformation of the internal thread surface 16 gradually decreases from a maximum deformation at the upper end 30 of the collar 14 to the base portion 32 of the area B immediately adjacent the deformations 24, 26 and 28. The remainder of the internal thread surface in the hexagon body of the nut 12, designated as area C, is left in an undistorted state.

Figure 3:
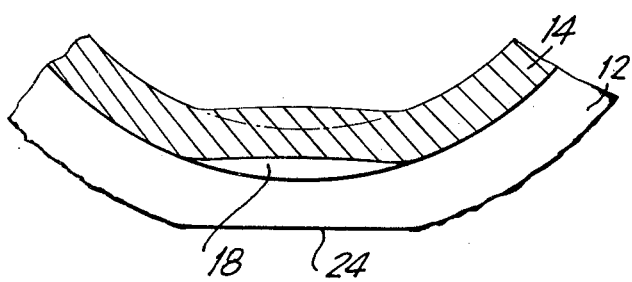
FIGURE 3 is a horizontal, sectional view taken on line 3—3 of FIGURE 2.

With reference now to FIGURE 3 as well, it is seen that the plastic deformations 18 and 24 produce a flat section in the lock nut 10 which distorts the internal thread surface 18 to produce an interference fit with a mating thread surface on a stud or bolt. It is this interference fit which provides the prevailing locking torque as a stud member is engaged and provides the self-locking function when the stud is fully seated.

With reference again to FIGURE 2, the locknut 10 is engaged on a mating thread or bolt with the initial threaded engagement at the lower end 34 so that at the outset threaded engagement between the nut and bolt occurs in area C where the threaded surface is undistorted. Hence, the nut is relatively free-wheeling on the bolt until the shank of the bolt is engaged up to area B. At this point, since the locknut is internally distorted at three spaced locations, an initial revailing torque is imparted to the nut and, since the internal thread distortion is tapered through the areas B and A, the prevailing torque increases gradually until, when the nut is fully engaged, the maximum predetermined prevailing torque is encountered. In practice, the deformed area B preferably provides approximately 15–30% of the prevailing torque while the area A provides the remaining 70–85%.

Of primary concern in the proper functioning of a locknut prepared according to the present invention is the type of deformation in the internal thread surface. It is to be understood that a wide variety of different shaped deformations are effective to produce locknuts having desirable locking torque characteristics, however, it has been found that deformations produced by a concave shaped deforming die are particularly effective to develop high locking torque values. Specifically, when a die having three movable spaced deforming pads, each with concave nut contacting exteriors, is used then when deforming pressure is applied to the die, the pads are forced against the exterior surface of the nut to cause the radially inward deformation at the selected locations. Preferably, each pad has a concave radius of curvature which is 10 to 30% greater than the ratius of the outer diameter of the nut and preferably 20% greater. Thus, the deformed portions 18 to 22 and 24 to 28 respectively have a slightly concave shape along a longitudinal axis. This type of deformation will deform the internal thread surface of the nut in a corresponding slightly convex configuration.

Because the locknut prepared according to the present invention provides a primary prevailing torque in the thinner collar wall and, also, a secondary prevailing torque, of somewhat lesser magnitude, in a portion of the hexagonal nut body, the locknut can be constructed from stock material that is not heat threaded or hardened. The secondary torque attributable to the hexagonal nut body portion insures sufficient self-lock ing capabilities in the nut and, also, there is an increased tendency for elastic deformation as the nut is engaged. The elastic deformation does not destroy the self-locking function of the nut, since the locking function is spread out over a larger portion of the thread surface, but allows a radially outward expansion or "breathing" as the nut is engaged so that thread wear, both on the locknut itself and the threaded stud member, is materially lessened.

It is thus seen that the present invention provides a locknut which can be manufactured from non-heat-treated stock, has superior locking capabilities while maintaining a more uniform self-locking function through repeated cycles of use and minimizes thread wear in both the locknut and stud member.

What is claimed is:

1. A locknut having a nut body portion with an exterior wrenching surface, an integral raised cylindrical collar of lesser diameter than said body portion extending from one end of said body portion and a continuous internally threaded surface within said body and collar portions to threadedly receive a co-acting stud member, the improvement comprising:
    at least one plastically deformed area in said collar portion to deform said internally threaded surface radially inwardly adjacent said collar deformed area thereby to cause an interference of the deformed threaded surface in said collar with a co-acting threaded stud member threaded therein,
    at least one plastically deformed area in said body portion in substantially axial alignment with said deformed area in said collar portion to deform said internally threaded surface readially inwardly adjacent the deformed area in said nut body thereby to cause an interference of the deformed threaded surface in said nut body with a co-acting threaded stud member threaded therein,
    said deformed areas in said collar portion and body portion being formed such that said radially inwardly deformed internally threaded areas taper generally uniformly from a maximum deformation at the open end of said collar to a minimum deformation near the open ends of said nut body portion near the juncture between said collar portion and said body portion and said radially inwardly deformed area in said body portion tapers generally uniformly from a maximum deformation near the juncture of said collar portion and said nut body portion to a minimum deformation near the open end of said nut body portion with the maximum radially inward deformation in said nut body portion being equal to or less than the minimum radially inward deformation in said collar portion.

3. A locknut having a nut body portion with an exterior wrenching surface, an integral raised cylindrical collar of lesser diameter than said body portion extending from one end of said body portion and a continuous internally threaded surface within said body and collar portions to threadedly receive a co-acting stud member, the improvement comprising:
    at least one plastically deformed area in said collar portion to deform said internally threaded surface radially inwardly adjacent said collar deformed area thereby to cause an interference of the deformed threaded surface in said collar with a co-acting threaded stud member threaded therein,
    at least one plastically deformed area in said body portion in substantially axial alignment with said deformed area in said collar portion to deform said internally threaded surface radially inwardly adjacent the deformed area in said nut body thereby to cause an interference of the deformed threaded surface in said nut body with a co-acting threaded stud member threaded therein,
    said deformed areas in said collar portion and body portion being formed such that said radially inwardly deformed internally threaded areas in said collar portion and body portion are contiguous and generally uniformly tapered from a maximum inward deformation of said threaded surface in said collar portion at the open end of said collar portion which gradualy tapers to a minimum inward deformation at an area intermediate the body portion ends.

4. A locknut as defined in claim 3 wherein said deformed area in said collar portion provides 70–85% of the locking torque of the locknut and said deformed area in said body portion provides 15–30% of the locking torque of the locknut.

5. A locknut as defined in claim 1 wherein said deformed areas in said collar portion are concave shaped along a longitudinal axis thereby to provide a convex shaped internal thread deformation.

6. A locknut as defined in claim 5 wherein the radius of curvature of said convex deformation is in the range of 10 to 30% greater than the radius of the outer diameter of said nut.

7. A locknut as defined in claim 5 wherein the radius of curvature of said convex deformation is 20% greater than the radius of the outer diameter of the nut.

References Cited

UNITED STATES PATENTS

| | | |
|---|---|---|
| 2,452,192 | 10/1948 | Hosking. |
| 2,679,879 | 6/1954 | Engstrom. |
| 3,198,230 | 8/1965 | Stover. |

FOREIGN PATENTS

| | | |
|---|---|---|
| 789,395 | 1/1958 | Great Britain. |

RAMON S. BRITTS, Primary Examiner